United States Patent
Dinc et al.

(10) Patent No.: US 6,505,834 B1
(45) Date of Patent: Jan. 14, 2003

(54) PRESSURE ACTUATED BRUSH SEAL

(75) Inventors: Osman Saim Dinc, Troy, NY (US); Mehmet Demiroglu, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,965

(22) Filed: Nov. 2, 2001

(51) Int. Cl.[7] .................... F16T 15/46; F01D 11/02
(52) U.S. Cl. .............. 277/355; 277/413; 277/580; 277/927; 415/173.2; 415/174.1; 415/176
(58) Field of Search ................. 277/355, 413, 277/421, 422, 579–581, 583, 926, 927; 415/173.2, 173.5, 174.1, 176

(56) References Cited

U.S. PATENT DOCUMENTS

| | | | | |
|---|---|---|---|---|
| 1,689,874 A | * | 10/1928 | Jabs | |
| 2,279,863 A | * | 4/1942 | Downer | |
| 2,614,870 A | * | 10/1952 | Ray | 277/413 |
| 2,851,289 A | * | 9/1958 | Pedersen | |
| 3,268,232 A | * | 8/1966 | Richards | |
| 3,400,937 A | * | 9/1968 | Crankshaw | |
| 3,594,010 A | * | 7/1971 | Hugo et al. | |
| 3,722,895 A | * | 3/1973 | Mevissen | |
| 3,971,563 A | * | 7/1976 | Sugimura | |
| 4,076,259 A | * | 2/1978 | Raimondi | |
| 4,373,858 A | * | 2/1983 | Eastman | 415/112 |
| 4,451,046 A | * | 5/1984 | Biven | 277/419 |
| 4,744,721 A | * | 5/1988 | Villeneuve | |
| 5,002,288 A | * | 3/1991 | Morrison et al. | |
| 5,192,083 A | * | 3/1993 | Jones, Jr. et al. | |
| 5,636,847 A | * | 6/1997 | Ostrowski | |
| 5,971,400 A | * | 10/1999 | Turnquist et al. | |
| 5,975,532 A | * | 11/1999 | Karttunen et al. | |
| 6,050,081 A | | 4/2000 | Jansen et al. | |
| 6,139,018 A | * | 10/2000 | Cromer et al. | |
| 6,299,077 B1 | | 10/2001 | Harmon et al. | |
| 6,302,399 B1 | * | 10/2001 | Prinzing | |

* cited by examiner

*Primary Examiner*—Anthony Knight
*Assistant Examiner*—Alison K. Pickard
(74) *Attorney, Agent, or Firm*—Patrick K. Patnode; Christian G. Cabou

(57) ABSTRACT

An embodiment providing a seal assembly for turbomachinery for controlling flow of a fluid medium in a fluid path comprises a casing having an internal pressure load path and a seal carrier chamber. A movable seal carrier is disposed within the seal carrier chamber and interposed between the pressure load path and an external flow path. In addition, a pressure selecting apparatus is coupled to the pressure load path to control flow therethrough. Moreover, the position of the movable seal carrier moves in response to a pressure differential determined by the pressure selecting apparatus between the pressure load path and the external flow path.

17 Claims, 3 Drawing Sheets

PRESSURE ACTUATED BRUSH SEAL

BACKGROUND OF INVENTION

The present invention relates generally to rotary machines, and more particularly to actuated seals for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, labyrinth seal performance degrades over time as a result of transient events in which the stationary and rotating components interfere, rubbing the labyrinth teeth into a "mushroom" profile and opening the seal clearance.

Accordingly, there is a need in the art for a rotary machine having improved leakage control between stationary and rotating components.

SUMMARY OF INVENTION

One embodiment of the present invention provides a seal assembly for turbomachinery for controlling flow of a fluid medium in a fluid path comprising a casing having an internal pressure load path and a seal carrier chamber. A movable seal carrier is disposed within the seal carrier chamber and interposed between the pressure load path and an external flow path. In addition, a pressure selecting apparatus is coupled to the pressure load path to control flow therethrough. Moreover, the position of the movable seal carrier moves in response to a pressure differential determined by the pressure selecting apparatus between the pressure load path and the external flow path.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
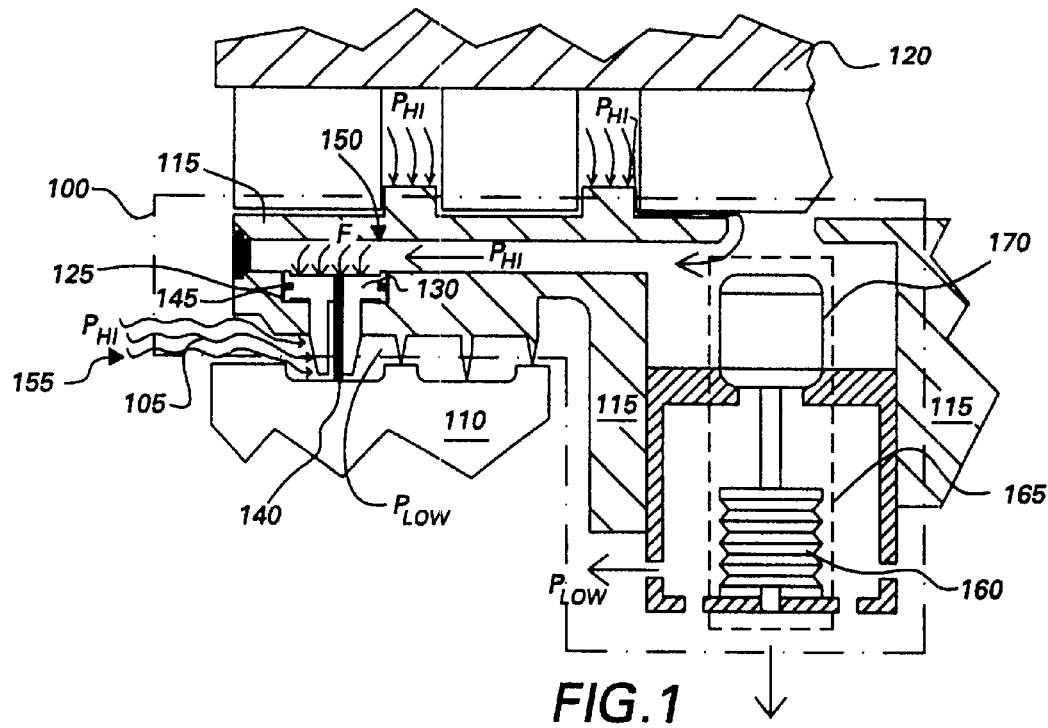
FIG. 1 is a schematic, cross-sectional exploded view of a pressure actuated seal comprising a labyrinth seal having a seal carrier disposed therein.
Figure 5:
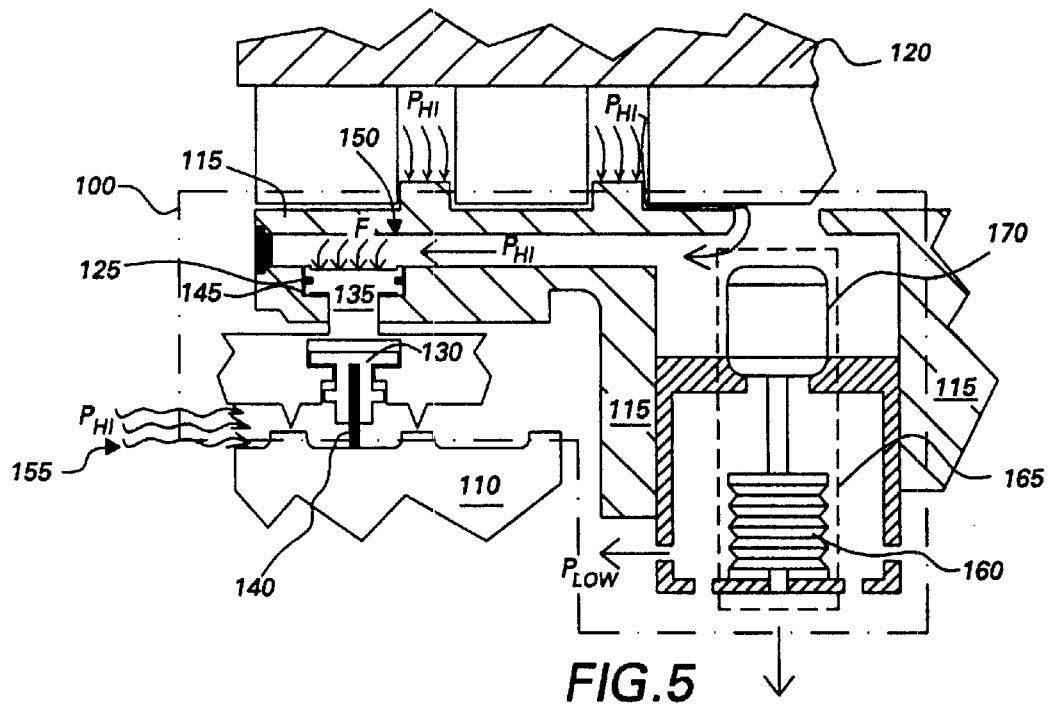
FIG. 5 is a schematic, cross-sectional exploded view of another embodiment of the instant invention.
Figure 6:
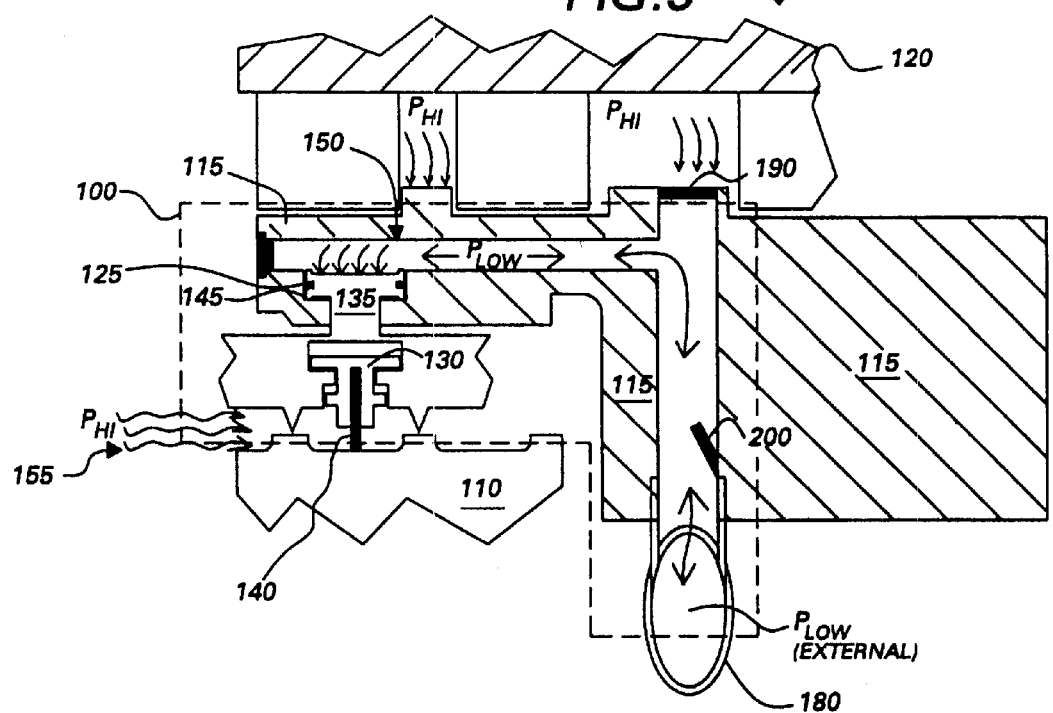
FIG. 6 is a schematic, cross-sectional exploded view of another mode of FIG. 5.

A pressure actuated seal assembly, generally designated 100, is disposed between a rotating member 110, for example a rotor, and a casing 115, where such casing 115 comprises an arcuate seal carrier 130 disposed adjacent to rotating member 110 separating pressure regions on axially opposite sides of arcuate seal carrier 130 (see FIG. 1). "Adjacent," as used herein, means that arcuate seal carrier 130 typically does not touch rotating member 110. FIG. 1 shows casing 15 having an arcuate seal carrier 130 disposed in a seal carrier chamber 145. Seal carrier 130 typically comprises, but is not limited to, at least one seal 140, such as, for example, at least one brush seal, coupled to seal carrier 130. It will be appreciated that other seals 140 may alternatively comprise abradable seals, honeycomb seals, leaf seals, finger seals, ceramic seals, aramid seals, aspirating seals and combinations thereof. It will be appreciated that in FIGS. 5 and 6, seal carrier 130 is disposed in a labyrinth seal 135 having the aforementioned components, singly or in any combination thereof.

Figure 2:
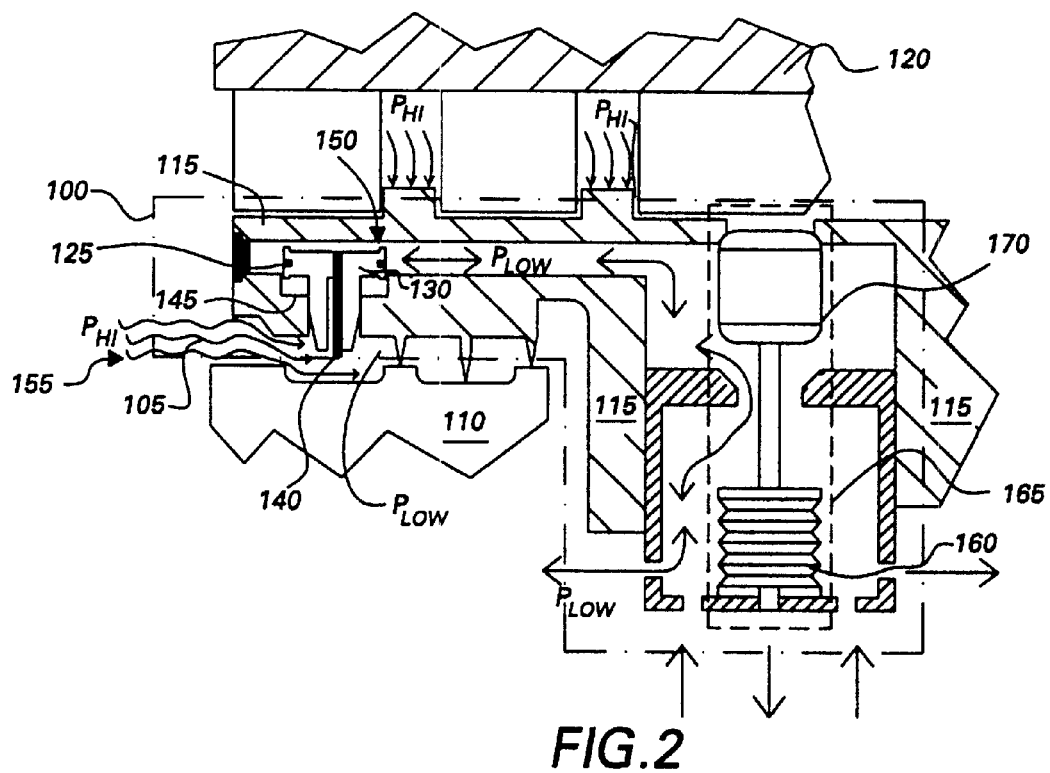
FIG. 2 is a schematic, cross-sectional exploded view of another mode of FIG. 1.

A pressure selecting apparatus 165, used as a pressure source to radially displace seal carrier 130, is in fluid communication with seal carrier 130. In one embodiment, by way of example not limitation, as shown in FIGS. 1 and 2, pressure selecting apparatus 165 comprises, but is not limited to, a bellows 160, a valve 170, or combinations thereof (see FIGS. 1 and 2). In an alternative embodiment, pressure selecting apparatus 165 comprises, but is not limited to, a tubing valve 190, atmospheric valve 200 or combinations thereof (see FIGS. 3 and 4). A drive system (not shown), for example, is used to power pressure selecting apparatus 165. It will be appreciated that the drive system typically comprises a motor, a pump, an electric power supply, for example. The pump may comprise a gas pump, water pump, or hydraulic pump, for example. The drive system may be manually or electrically actuated and the position of the drive system may be internal or external to pressure actuated seal assembly 100.

These components form part of a turbine in which a flowing fluid medium in a fluid path 105, for example, gas or steam, is passed between the rotating member 110 and casing 115 (see FIG. 1). It will be appreciated, however, that fluid medium in fluid path 105 flows from the high pressure side, designated "Phi", towards the low pressure side, designated "Plow", i.e., from the left to right of drawing FIG. 1. For illustrative purposes, FIG. 1 shows seal carrier 130 and accompanying seal 140 in the closed position. "Closed" as used herein means that seal carrier 130, in conjunction with seal 140, restricts the flow of pressure from Phi to Plow. It will be appreciated that seal carrier 130 may comprise, for example, at least one gasket 125 comprising, for example, an o-ring, c-seal or w-seal so as to provide a seal between seal carrier 130 and labyrinth seal 135 (see FIGS. 5 and 6) or alternatively seal carrier 130 and casing 115 (see FIG. 1).

When pressure selecting apparatus 165 is not displaced, Phi generates a large radial pressure load, designated "F", on top of seal carrier 130. As used herein, directional words such as, for example, "on", "in", "over", "above", and "under" are used to refer to the relative location of elements of pressure actuated seal assembly 100 as illustrated in the Figures and is not meant to be a limitation in any manner with respect to the orientation or operation of pressure actuated seal assembly 100. Pressure load "F" keeps seal 140 disposed against rotating member 110.

Alternatively, when pressure selecting apparatus 165 is displaced, Plow is disposed in pressure load path 150 so as to create a pressure differential between the top section of seal carrier 130 exposed to pressure load path 150 and the underside of seal carrier 130 exposed to external flow path 155 (see FIG. 2). Consequently, the difference in pressures causes Phi to force seal carrier 130 radially outward and open a fluid path gap defined between seal 140 and rotating member 110.

In operation, pressure selecting apparatus 165 causes the seal carrier 130 to move radially in seal carrier chamber 145 during operation or during transient events, for example, during startup and shutdown. In one embodiment, by way of example and not limitation, pressure selecting apparatus 165 comprises a bellows 160 coupled to a valve 170 as shown in FIGS. 1 and 2. When the bellows 160 is not displaced or pressurized, the valve 170 allows Phi to enter pressure load path 150 and subsequently force seal carrier 130 radially inward and thereby causing a restriction of flow of the fluid path 105 between the seal 140 and the rotating member 110 (see FIG. 1). However, when the bellows 160 is displaced or pressurized, the valve 170 stops the flow of Phi into pressure load path 150 and exposes pressure load path 150 to Plow (see FIG. 2). As a result, seal carrier 130 is forced radially outward due to the pressure difference between the top section of seal carrier 130 exposed to pressure load path 150 and the underside of seal carrier 130 exposed to external flow path 155. It will be appreciated that Phi may be obtained from internal system pressures or from an external pressure source. For example, Phi may comprise internal pressures generated by the turbine where such pressures are disposed between a turbine housing 120 and casing 115. It will be appreciated that at least one pressure selecting apparatus 165, for example, may be disposed in fluid communication with at least one seal carrier 130 (meaning a plurality of seal carriers 130 or a single seal carrier 130) in pressure actuated seal assembly 100. By being able to radially move pressure actuated seal assembly 100 during operation, the life of the seal 140 (e.g., bristles) is extended by moving the position of the seat 140 and seal carrier 130 so as to reduce wear against rotating member When the seal 140 comprises a brush seal, the life and performance of the brush seal bristles, singly or in combination with other seals, for example, is increased due to the fact that the bristles do not continuously rub rotating member 110 at a high speeds in cases when rotating member 110 is off-balance. Continuous rubbing causes the bristles of seal 140 to reach a melting temperature or to cause excessive wear on the bristles. When labyrinth seals are used, the performance of labyrinth teeth seals, singly or in combination with other seals, for example, degrade less rapidly over time because the teeth are less prone to break off or be rubbed into a "mushroom" profile thus maintaining an optimal seal clearance between labyrinth seal 135 and rotating member 110 (see FIGS. 5 and 6).

Figure 3:
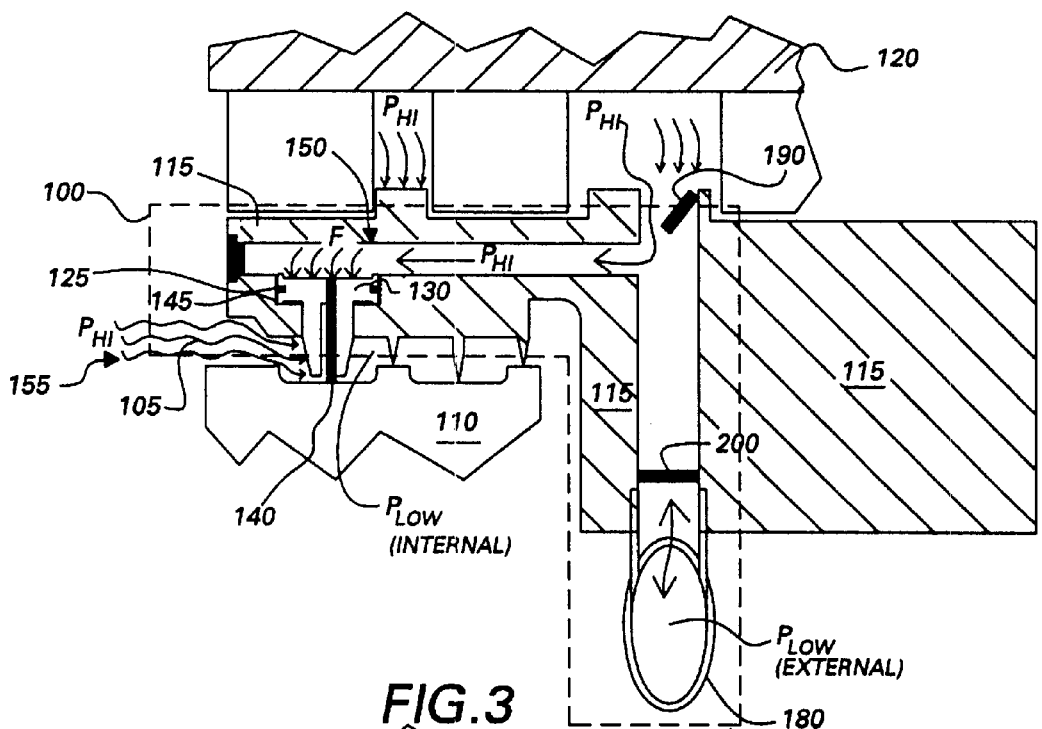
FIG. 3 is a schematic, cross-sectional exploded view of another embodiment of the instant invention.
Figure 4:
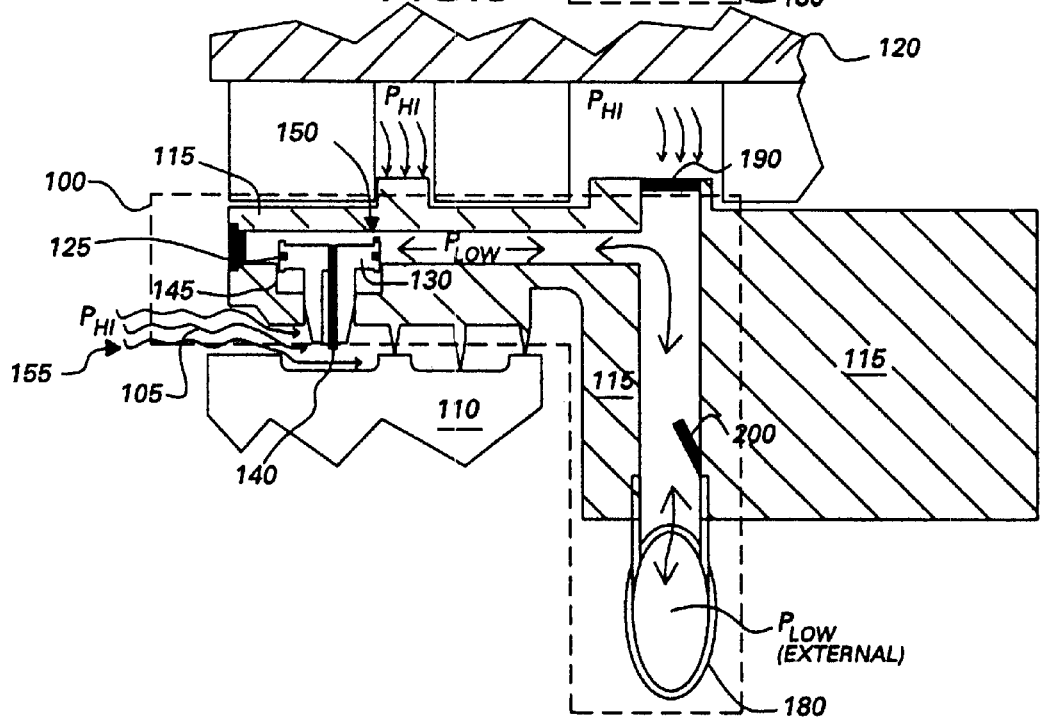
FIG. 4 is a schematic, cross-sectional exploded view of another mode of FIG. 3.

In another embodiment, the pressure, designated "F", may be obtained from internal or external pressure sources by means of a tubing 180 connected internally or externally to pressure actuated seal assembly 100 (see FIG. 3). In one embodiment, tubing 180 comprises a manifold-type tubing which comprises a tubing valve 190 disposed internally to the turbine. During steady state operation, tubing valve 190 is positioned to allow Phi to flow therethrough to maintain a radially inward pressure on seal carrier 130 and thereby cause a restriction of flow of the fluid medium in the fluid path 105 between the seal 140 and the rotating member 110 as shown in FIG. 3. In an alternative embodiment, the pressure "Phi", may also be obtained from an external system pressure source which uses a drive system (not shown) to supply radially inward pressure "F" to seal carrier 130 (see FIG. 4). In this embodiment, tubing valve 190 is closed so as to restrict the flow of Phi into pressure load path 150, and an atmospheric valve 200 is open so as to allow Plow to be disposed in pressure load path 150 and create a pressure differential between the top section of seal carrier 130, exposed to pressure load path 150, and the underside of seal carrier 130 which is exposed to external flow path 155. As a result, the difference in pressures causes Phi to force seal carrier 130 radially outward and open a fluid path gap defined between seal 140 and rotating member 110. It will be appreciated that valve 170 (see FIG. 1), tubing valve 190 and atmospheric valve 200 (see FIG. 3), singly or in combination, are configured so as to allow a fluid medium from either internal or external pressure sources therethrough and create a throttling effect on said seal carrier. "Throttling," as used herein, means using valve 170 (see FIG. 1), tubing valve 190 and atmospheric valve 200 (see FIG. 3), singly or in combination, to obstruct the internal or external pressure flow so as to selectively control the force "F" disposed on the seal 140 of the seal carrier 130. The number and the position of tubing valve 190 and atmospheric valve 200 may be varied depending on the application and the number and position of these valves are used only for illustrative purposes herein. It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A seal assembly for turbomachinery for controlling flow of a fluid medium in a fluid path comprising:

a casing comprising an internal pressure load path and a seal carrier chamber; an external flow path;

a seal carrier disposed within said seal carrier chamber and interposed between said pressure load path and said external flow path, wherein the position of said seal carrier is movable in response to a pressure differential between said pressure load path and said external flow path; and a pressure selecting apparatus coupled to said pressure load path and configured to control the pressure differential wherein said pressure selecting apparatus is adapted to allow said fluid medium in a low pressure source to flow through said pressure load path thereby displacing said seal carrier radially outward with respect to the seal carrier chamber.

2. The seal assembly of claim 1, wherein said casing comprises a turbine casing.

3. The seal assembly of claim 1, further comprising a seal disposed in said seal carrier.

4. The seal assembly of claim 3, wherein said seal is selected from the group consisting of brush seals, abradable seals, honeycomb seals, leaf seals, finger seals, ceramic seals, aramid seals, aspirating seals and combinations thereof.

5. The seal assembly of claim 1, further comprising said seal carrier disposed in a labyrinth seal.

6. The seal assembly of claim 1, wherein the position of said seal carrier is movable during operation of said turbomachinery.

7. The seal assembly of claim 1, wherein said pressure selecting apparatus is selected from the group consisting of valves, bellows and combinations thereof.

8. The seal assembly of claim 1, wherein said pressure selecting apparatus is adapted to allow said fluid medium in a high pressure source to flow through said pressure load path and force said seal carrier radially inward with respect to seal carrier chamber thereby causing a restriction of flow of said fluid medium in said fluid path between a seal disposed in said sealed carrier and a rotating member.

9. A seal assembly for a turbine for controlling flow of a fluid medium in a fluid path comprising:
- a turbine casing comprising an internal pressure load path and a seal carrier chamber;
- a rotating member disposed adjacent said turbine casing;
- an external flow path disposed between said turbine casing and said rotating member;
- a seal carrier disposed within said seal carrier chamber and interposed between said pressure load path and said external flow path, wherein the position of said seal carrier is movable in response to a pressure differential between said pressure load path and said external load path;
- a seal disposed within said seal carrier; and
- a pressure selecting apparatus coupled to said pressure load path and configured to control said pressure differential and consequently move said seal radially wherein said pressure selecting apparatus is adapted to allow said fluid medium in a low pressure source to flow through said pressure load path thereby displacing said seal carrier radially outward with respect to the seal carrier chamber.

10. The seal assembly of claim 9, wherein said seal is selected from the group consisting of brush seals, abradable seals, honeycomb seals, leaf seals, finger seals, ceramic seals, aramid seals, aspirating seals and combinations thereof.

11. The seal assembly of claim 9, further comprising said seal carrier disposed in a labyrinth seal.

12. The seal assembly of claim 9, wherein said seal carrier is movable during operation of said turbine.

13. The seal assembly of claim 9, wherein said pressure selecting apparatus is selected from the group consisting of valves, bellows and combinations thereof.

14. The seal assembly of claim 9, wherein said pressure selecting apparatus is adapted to allow said fluid medium in a high pressure source to flow through said pressure load path and force said seal carrier radially inward with respect to seal carrier chamber thereby causing a restriction of flow of said fluid medium in said fluid path between said seal and said rotating member.

15. The seal assembly of claim 9, wherein said seal carrier comprises a plurality of seal carriers, and wherein said pressure selecting apparatus is disposed in fluid communication with said plurality of seal carriers in said turbine.

16. The seal assembly of claim 9, wherein said pressure selecting apparatus is disposed in fluid communication with each of said seal carriers in said turbine.

17. The seal assembly of claim 9, wherein said seal carrier comprises a single seal carrier, and wherein said pressure selecting apparatus is disposed in fluid communication with said single seal carrier in said turbine.

* * * * *